United States Patent
Brown et al.

(10) Patent No.: US 9,694,332 B2
(45) Date of Patent: Jul. 4, 2017

(54) SLURRY MIXER DISCHARGE GATE ADAPTER WITH TRANSITIONING CROSS-SECTIONAL GEOMETRY

(71) Applicant: UNITED STATES GYPSUM COMPANY, Chicago, IL (US)

(72) Inventors: Stanley C. Brown, Redmond, UT (US); Steven Johnson, Elsinore, UT (US); Christopher Shumway, Richfield, UT (US); Phillip Parker, Salina, UT (US); James R. Wittbold, Des Plaines, IL (US)

(73) Assignee: UNITED STATES GYPSUM COMPANY, Chicago, IL (US)

( * ) Notice: Subject to any disclaimer, the term of this patent is extended or adjusted under 35 U.S.C. 154(b) by 14 days.

(21) Appl. No.: 14/736,510

(22) Filed: Jun. 11, 2015

(65) Prior Publication Data
US 2016/0121287 A1    May 5, 2016

Related U.S. Application Data

(60) Provisional application No. 62/072,654, filed on Oct. 30, 2014.

(51) Int. Cl.
*B01F 15/02* (2006.01)
*B28C 7/16* (2006.01)
(Continued)

(52) U.S. Cl.
CPC ...... *B01F 15/0292* (2013.01); *B01F 15/0266* (2013.01); *B28C 5/0881* (2013.01);
(Continued)

(58) Field of Classification Search
CPC .................. B01F 15/0266; B01F 15/0292
(Continued)

(56) References Cited

U.S. PATENT DOCUMENTS 2,253,059 A  *  8/1941  Camp ................. B01F 7/00758
                                                         366/65
3,459,620 A  *  8/1969  McCleary ............. B28C 5/0881
                                                         156/346

(Continued)

FOREIGN PATENT DOCUMENTS

DE         102008003738 A1      7/2009
WO         WO 9967074 A1  *  12/1999  ............. B28B 13/02
WO         2014112865 A1      7/2014

OTHER PUBLICATIONS

Search Report from International Patent Application No. PCT/US2015/030078, dated Jul. 17, 2015.
(Continued)

*Primary Examiner* — Charles Cooley
(74) *Attorney, Agent, or Firm* — Greer, Burns & Crain, Ltd.; Pradip K. Sahu; Philip T. Petti

(57) ABSTRACT

A discharge gate for a gypsum slurry mixer is provided, and includes a gate adapter having an inlet opening configured for receiving the slurry, and an outlet opening configured for delivering the slurry to a dispensing device. The gate adapter has two different transitioning cross-sectional geometries at opposite ends. Specifically, the gate adapter includes an inlet section having a quadrilateral inlet opening; an outlet section having a substantially circular outlet opening; and a transition section sandwiched between the inlet and outlet sections.

11 Claims, 9 Drawing Sheets

(51) Int. Cl.
 *B28C 5/08* (2006.01)
 *F16L 25/14* (2006.01)
(52) U.S. Cl.
 CPC ........ *B28C 7/16* (2013.01); *B01F 2215/0078* (2013.01); *F16L 25/14* (2013.01)
(58) Field of Classification Search
 USPC ........ 366/64, 96–99, 162.1, 6, 8, 18, 20, 35, 366/38, 51, 65, 102, 141, 168.1, 171.1, 366/172.1, 172.2, 181.7, 303–304, 366/315–317; 156/39, 44
 See application file for complete search history.

(56) References Cited

U.S. PATENT DOCUMENTS

| | | | |
|---|---|---|---|
| 5,643,510 A | 7/1997 | Sucech | |
| 5,683,635 A * | 11/1997 | Sucech | ............... B28B 19/0092 156/346 |
| 6,193,408 B1 * | 2/2001 | Miura | ................. B01F 7/00758 366/304 |
| 6,494,609 B1 | 12/2002 | Wittbold et al. | |
| 6,874,930 B2 | 4/2005 | Wittbold et al. | |
| 7,007,914 B2 | 3/2006 | Peterson et al. | |
| 2003/0117891 A1 * | 6/2003 | Wittbold | ............... B01F 3/1221 366/192 |
| 2004/0062141 A1 * | 4/2004 | Shrader | ................. B01F 5/0646 366/155.1 |
| 2005/0248049 A1 | 11/2005 | Gannaway et al. | |
| 2005/0253098 A1 * | 11/2005 | Petersen | .................... F16K 7/06 251/4 |
| 2006/0045975 A1 * | 3/2006 | Yamaji | ................ B28B 19/0015 427/355 |
| 2007/0008815 A1 * | 1/2007 | Nakamura | .......... B01F 7/00766 366/172.1 |
| 2012/0287748 A1 | 11/2012 | Pourcel et al. | |
| 2012/0308463 A1 * | 12/2012 | Li | ....................... B01F 3/04446 423/265 |
| 2015/0315074 A1 | 11/2015 | Ueno et al. | |
| 2015/0328607 A1 * | 11/2015 | Wittbold | ............. B01F 15/0267 366/167.1 |
| 2016/0121287 A1 * | 5/2016 | Brown | ...................... B28C 7/16 366/192 |

OTHER PUBLICATIONS

International Search Report from International Application No. PCT/US2015/055630, mailed Mar. 15, 2016.

* cited by examiner

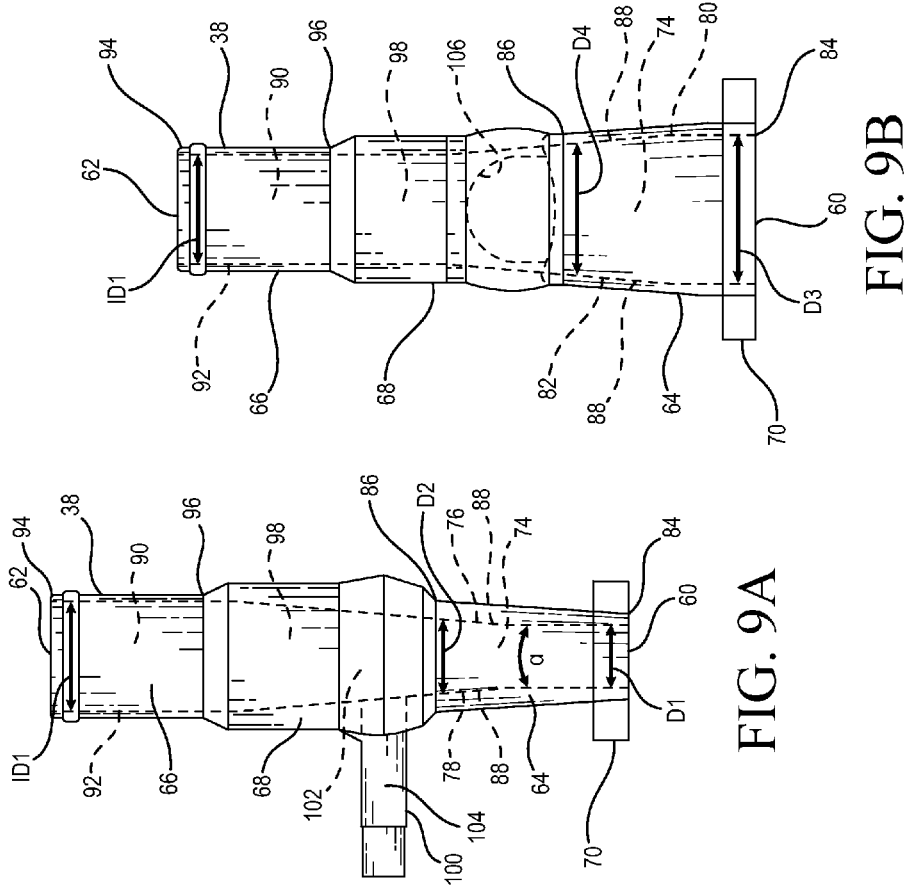

SLURRY MIXER DISCHARGE GATE ADAPTER WITH TRANSITIONING CROSS-SECTIONAL GEOMETRY

CROSS-REFERENCE

This application claims priority of U.S. Provisional Application Ser. No. 62/072,654, filed Oct. 30, 2014 under 35 U.S.C. §119(e), which is incorporated herein by reference.

BACKGROUND

The present disclosure generally relates to an apparatus for preparing gypsum products from starting materials including calcined gypsum and water, and more particularly relates to an improved gypsum slurry mixer gate for use in conjunction with a slurry mixer of the type employed in supplying agitated gypsum slurry to a wallboard production line.

It is well known to produce gypsum products by dispersing calcined gypsum in water to form a slurry, and then casting the slurry into a desired shaped mold or onto a surface and allowing the slurry to set to form hardened gypsum by reaction of the calcined gypsum (calcium sulfate hemihydrite or anhydrite) with the water to form hydrated gypsum (calcium sulfate dihydrate). Prior apparatus and methods for addressing some of the operational problems associated with the production of mixed gypsum are disclosed in commonly-assigned U.S. Pat. Nos. 6,494,609 and 7,007,914; both of which are incorporated by reference in their entireties. A gypsum wallboard mixer typically includes a housing defining a mixing chamber with inlets for receiving calcined gypsum and water, among other additives well known in the art. The mixer includes an impeller or other type of agitator for agitating the contents to be mixed into a mixture or slurry. Such mixers typically have a circular, tangential discharge gate or slot with a cutoff block or door. The discharge gate controls the flow of slurry from the mixer, but is difficult to adjust or change the slurry flow when product requirements change, such as when thicker or thinner wallboard is desired.

Conventionally, the tangential discharge gate or slot is disposed at an outlet of the mixer in a peripheral wall for the discharge of the major portion of the slurry. A flexible hose having a generally circular cross-section is inserted into the generally rectangular discharge gate for transporting slurry to a desired location, such as the moving conveyor belt of a wallboard production line. However, due to the disparity of the respective cross-sectional geometries of the discharge gate opening and the hose, the hose does not capture the entire potential slurry flow volume from the gate, especially that portion of the slurry circulating above the top of the circular gate opening. As a result, some portions of the slurry in the mixer or the discharge gate keep flowing in the mixer and re-entering into the mixing chamber. In some cases, the slurry has been known to prematurely preset inside the mixer or the discharge gate, which is undesirable due to the production of lumps in the resulting wallboard, and increased labor needed for cleaning the mixer chamber of preset particles.

In conventional mixers, the slurry portions traveling at the highest and/or lowest points of a circular inlet/outlet opening of the discharge gate fail to escape completely from the mixer, and continue to circulate in the mixer, thereby creating slurry lumps and thickening slurry chunks. As a result, in some applications, the circular discharge gate causes slurry flow problems, such as premature setting, buildup, and clogging, and thus makes it difficult to efficiently deliver the mixed slurry through from the mixer to the outlet opening of the discharge gate.

Therefore, there is a need for an improved discharge gate that provides a consistent, even flow of the gypsum slurry from the mixer to the outlet opening of the discharge gate for promoting a smooth delivery of the mixed slurry during operation.

SUMMARY

The present disclosure provides an apparatus that promotes an improved slurry flow and mixture inside the mixer and the discharge gate, and provides an improved discharge gate configuration. An important aspect of the present discharge gate is that the gate includes a gate adapter or reducer having an inlet opening that is substantially rectangular, and has an outlet opening that is substantially circular. More specifically, a rectangular cross-sectional geometry of the inlet opening transitions to a circular cross-sectional geometry of the outlet opening along a longitudinal axis of the gate adapter. Such an arrangement provides a gradual, blending, continuously transitioning cross-sectional geometry along the entire length of the longitudinal axis of the gate adapter. This transitional configuration in the gate adapter has been discovered to be very beneficial in promoting a desired even, consistent flow of the mixed slurry through the gate.

Further, it is important to deliver all portions of the mixed slurry as the slurry flows from the mixing chamber for enhancing slurry blending in the discharge gate. While the mixing dynamics of the slurry are somewhat unpredictable, it is important to achieve a uniform delivery of the moving slurry as it exits the gate. In the present mixer gate, the gate adapter is installed at an outlet of the gate for regulating a backpressure of the slurry flow. As such, the present gate adapter delivers the mixed slurry more uniformly with an even pressure.

In one embodiment, a discharge gate for a gypsum slurry mixer is provided, and includes a gate adapter having an inlet opening configured for receiving the slurry, and an outlet opening configured for delivering the slurry to a dispensing device. The gate adapter has two different transitioning cross-sectional geometries at opposite ends. Specifically, the gate adapter includes an inlet section having a quadrilateral inlet opening; an outlet section having a substantially circular outlet opening; and a transition section sandwiched between the inlet and outlet sections.

In another embodiment, a gate adapter for delivering a mixed slurry from a gypsum slurry mixer is provided. Included in the gate adapter are an inlet section having a quadrilateral inlet opening; an outlet section having a substantially circular outlet opening; and a transition section sandwiched between the inlet and outlet sections. A quadrilateral cross-sectional geometry of the inlet opening transitions to a circular cross-sections geometry of the outlet opening along a longitudinal axis of the gate adapter.

BRIEF DESCRIPTION OF THE DRAWINGS

FIG. 9A is a side view of the present gate adapter;

FIG. 9B is atop view of the gate adapter of FIG. 9A; and

FIG. 9C is a rear view of the present gate of FIG. 9A.

DETAILED DESCRIPTION

Figure 1:
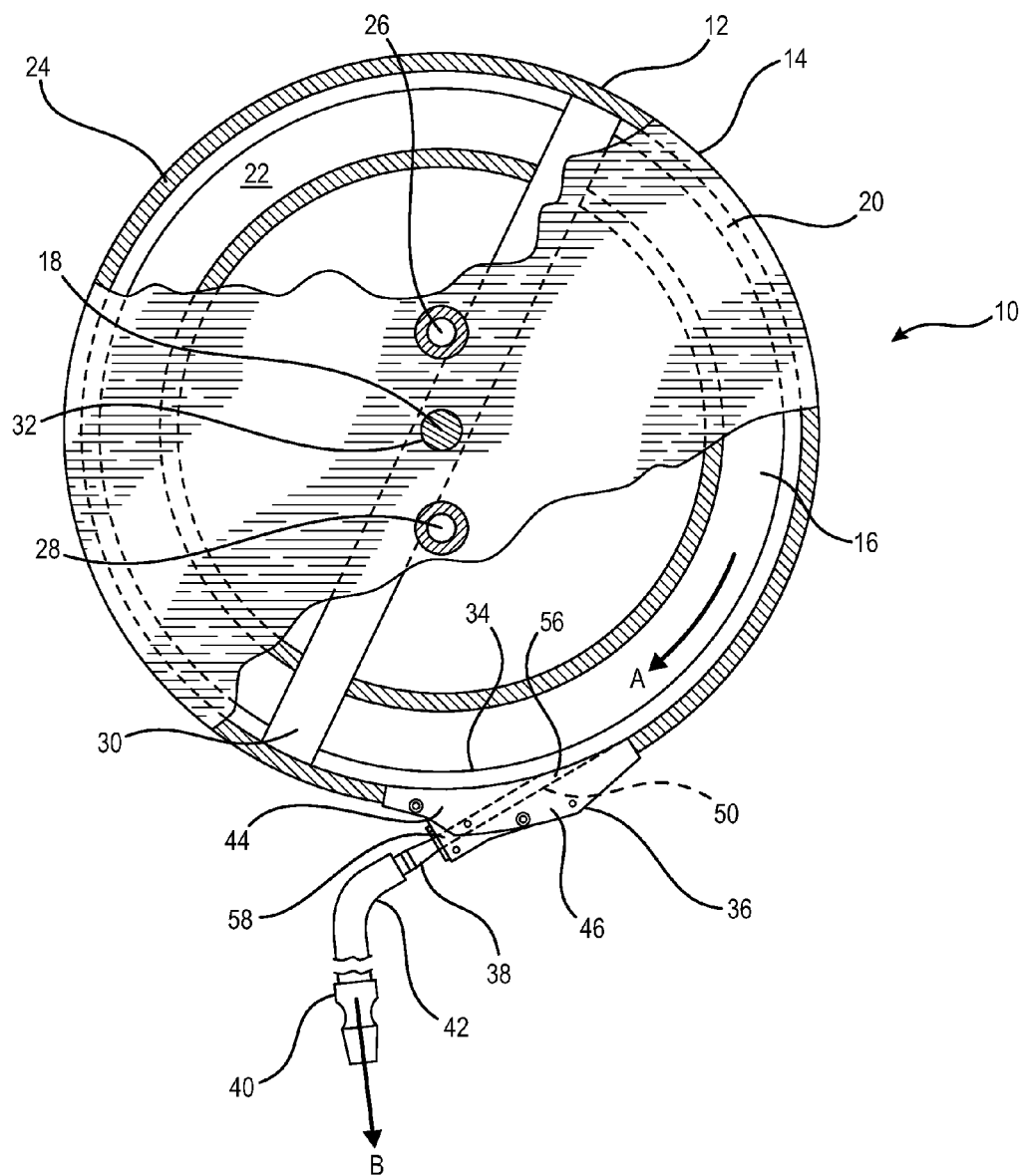
FIG. 1 is a fragmentary plan view of a mixing apparatus incorporating the features of the present discharge gate.

Referring now to FIG. 1, an exemplary mixing apparatus for mixing and dispensing a slurry is generally designated 10 and includes a mixer 12 having a housing 14 configured for receiving and mixing the slurry. The housing 14 defines a mixing chamber 16 which is preferably generally cylindrical in shape, has a generally vertical axis 18, an upper radial wall 20, a lower radial wall 22 and an annular peripheral wall 24. An inlet 26 for calcined gypsum and an inlet 28 for water are both positioned the upper radial wall 20, preferably proximate to the vertical axis 18. It should be appreciated that the inlets 26, 28 can be located on other portions of the mixer 12, and are connected to gypsum and water supply containers respectively (not shown), such that gypsum and water can be supplied to the mixing chamber 16 by simple gravity feed. Also, as is well known in the art, other materials or additives in addition to gypsum and water, often employed in slurries to prepare gypsum products (e.g. accelerators, retarders, fillers, starch, binders, strengtheners, etc.) can also be supplied through these or other inlets similarly positioned.

An agitator 30 is disposed in the mixing chamber 16 and has a generally vertical drive shaft 32 positioned concentrically with the vertical axis 18 and extends through the upper radial wall 20. The shaft 32 is connected to a conventional drive source, such as a motor, for rotating the shaft at whatever speed is appropriate for agitating the agitator 30 to mix the contents of the mixing chamber 16. Speeds in the range of 275-300 rpm are common. This rotation directs the resulting aqueous slurry in a generally centrifugal direction, such as in a counter-clockwise or clockwise outward spiral indicated by the arrow A. Also, the present mixer 30 is also referred to as a "pin" mixer due to the agitator pins (not shown) depending from the agitator and into the slurry in the chamber 16. It should be appreciated that this depiction of an agitator 30 is relatively simplistic and meant only to indicate the basic principles of agitators commonly employed in gypsum slurry mixing chambers known in the art. Alternative agitator designs, including those employing projections or paddles, are contemplated.

At a mixer outlet 34, the present discharge gate 36 featuring a transitional gate adapter or reducer 38 is attached to the peripheral wall 24 of the mixer 12 for the discharge of the major portion of the well-mixed slurry into a dispensing apparatus 40 via a cylindrical conduit 42 such as a pipe or a flexible boot or hose in a direction indicated by the arrow B. In the preferred embodiment, the gate adapter 38 is made of metal, such as stainless steel, but other equivalent, durable materials are also contemplated. As is known in the art, the ultimate destination of the slurry emitted by the dispensing apparatus is a gypsum wallboard production line, including a moving conveyor belt. While the geometry of the mixer outlet 34 is preferably rectangular in cross-section, other suitable shapes are contemplated to suit the application.

Also, while it is contemplated that the specific configuration of the mixer 12 may vary, it is preferred that the mixer is of the centrifugal type commonly used in the manufacture of gypsum wallboard, and also of the type in which the outlet 34 dispenses the slurry tangentially to the housing 14. In one embodiment, a cutoff block 44 is integrally formed with the discharge gate 36 to mechanically adjust the flow of slurry for the desired thickness of wallboard, typically ranging from ¼" to 1". However, separate fabrication and subsequent attachment of the cutoff block 44 to the gate 36 is contemplated.

During operation, the cutoff block 44 often creates a site for the premature setting of gypsum, resulting in slurry buildup and eventual clogging and disruption of the wallboard panel production line. Further, when the discharge gate 36 is set for thick wallboard and a conversion is made to thin wallboard, insufficient backpressure is provided in the mixing chamber 16, which in some cases results in an incomplete and nonuniform mixing of slurry constituents. Also, the inadequate backpressure results in dead spots or slow spots in the centrifugal internal flow in the mixing chamber 16, causing premature setup of the slurry and unwanted lumps in the mixture. In such instances, the wallboard line must be shut down for maintenance, causing inefficiencies in production. As explained in greater detail below, the present discharge gate 36 provides solutions to these operational problems.

Referring now to FIGS. 1-3 and 8, in the discharge gate 36, it is preferred that the present gate adapter or reducer 38 is removably attached to the discharge gate, and is in fluid communication with the mixing chamber 16. Typically, the discharge gate 36 has an upper member 46, a lower member 48, and a cavity or channel 50 defined by space between the upper and lower members. The upper and lower members 46, 48 are separated a distance generally corresponding to the vertical spacing of the upper and lower mixer radial walls, 20, 22. Attachment of the upper and lower members 46, 48 is achieved by using a first side wall 52 and a second side wall 54 with conventional fasteners, adhesives, welding, or other suitable methods known in the art. As discussed in greater detail below, the mixed slurry is injected into the cavity or channel 50 for delivery to the gate adapter 38.

Figure 8:
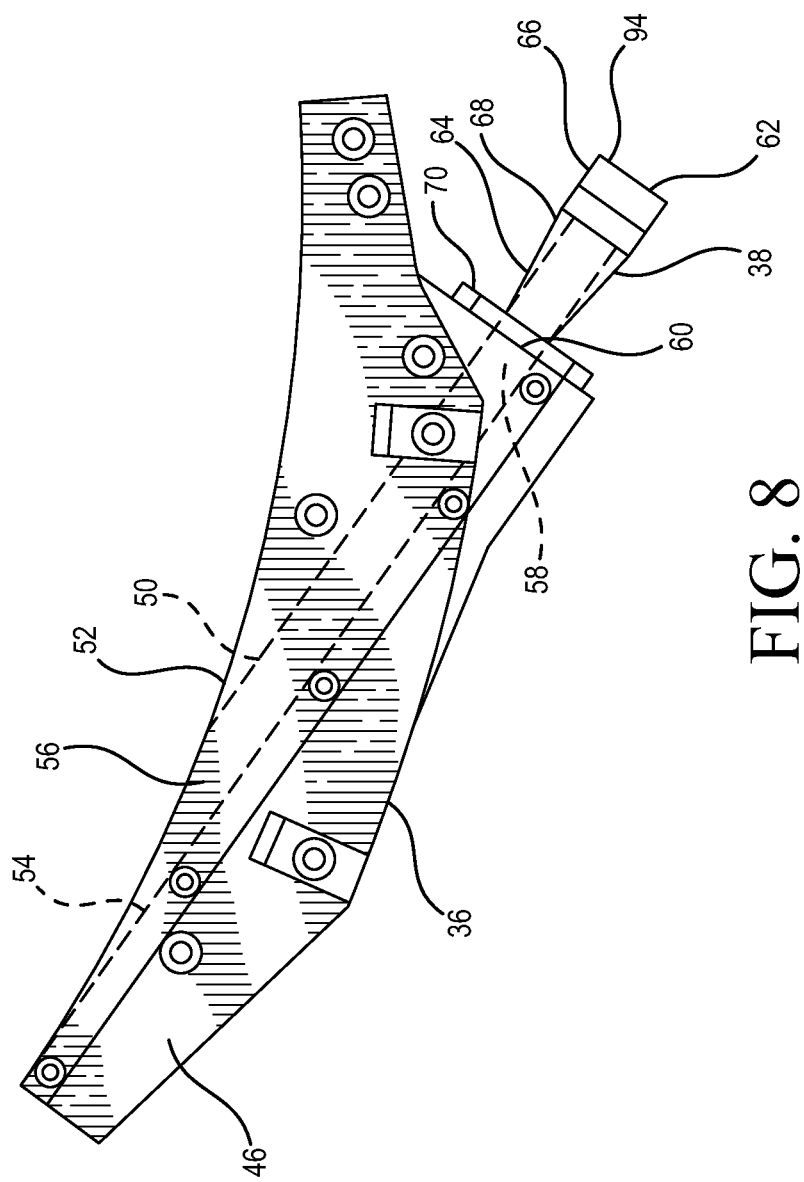
FIG. 8 is a plan view of the present gate adapter of FIG. 2 installed on the discharge gate after assembly.

Included in the discharge gate 36 are an inlet opening 56 configured for receiving the mixed slurry from the mixing chamber 16, and an outlet opening 58 configured for delivering the mixed slurry to the gate adapter 38. The inlet opening 56 generally follows a contour or profile of the rectangular mixer outlet 34, and similarly the outlet opening 58 has substantially the same contour or profile of the inlet opening. It is preferred that an inlet opening 60 of the gate adapter 38 is connected to the outlet opening 58 of the gate 36, and at an opposite end, an outlet opening 62 of the gate adapter is connected to the conduit 42 (FIGS. 1 and 8).

Figure 3:
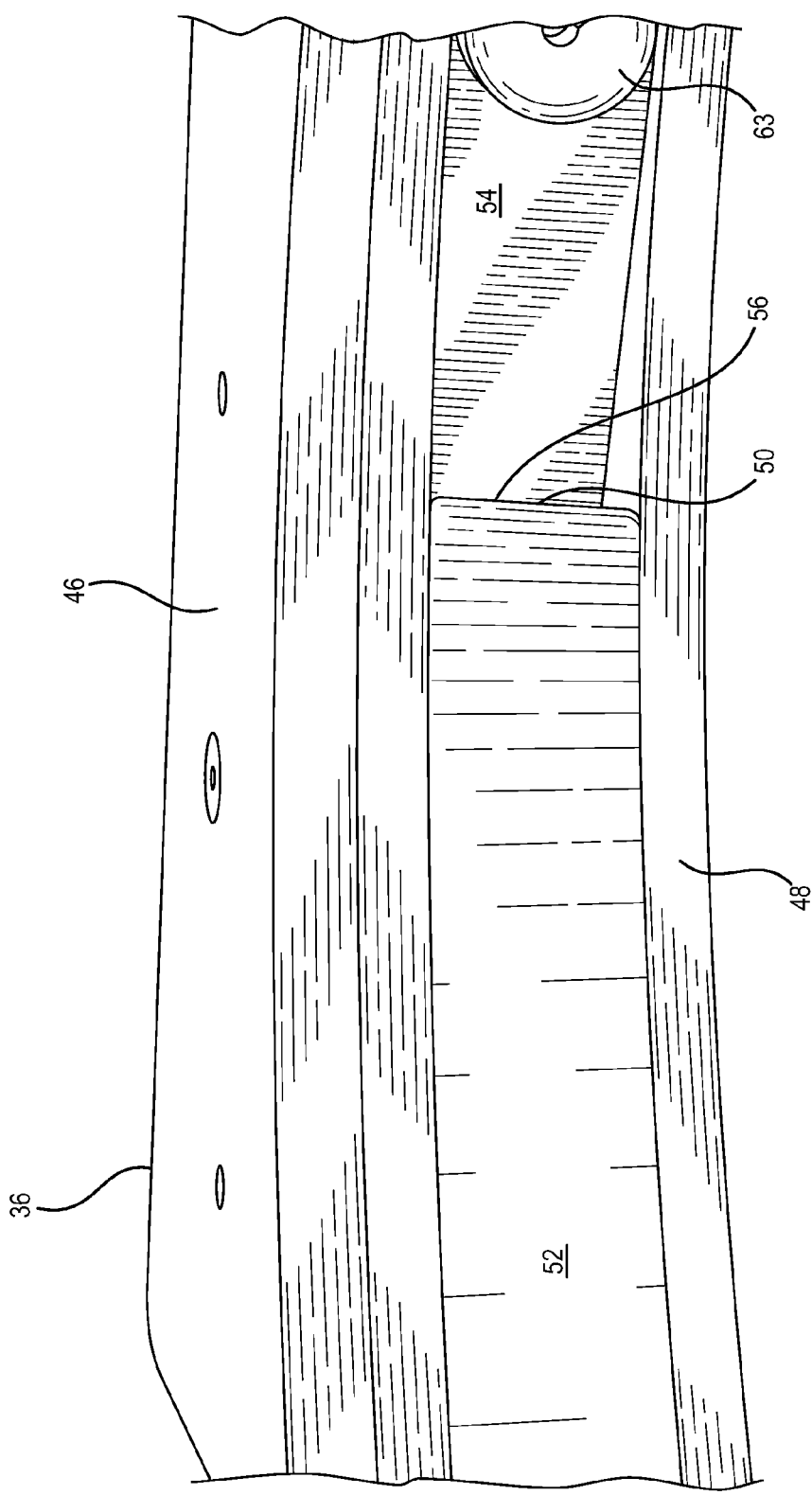
FIG. 3 is a fragmentary interior side perspective view of the present discharge gate, featuring an inlet opening.
Figure 4:
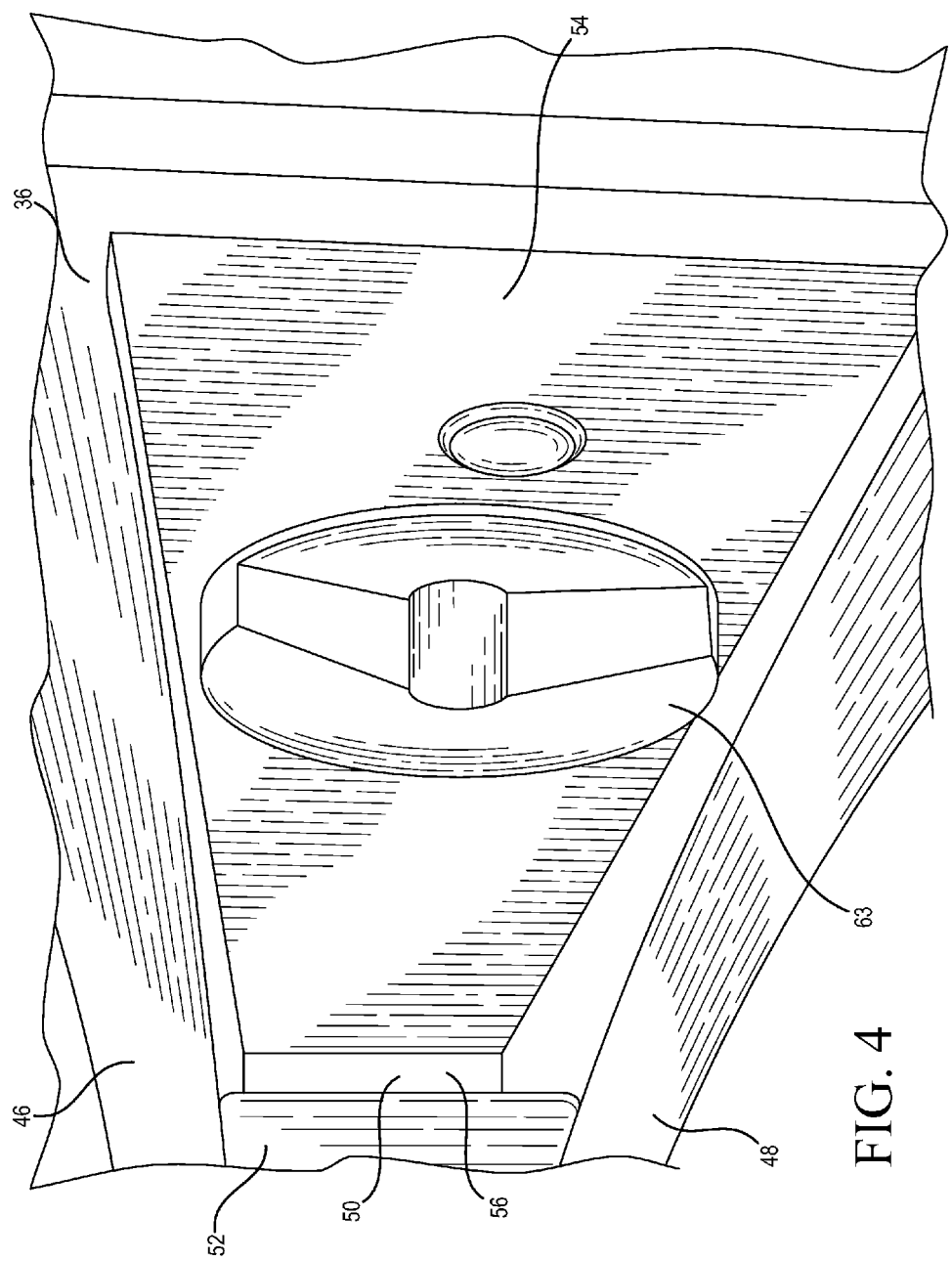
FIG. 4 is an enlarged view of the present discharge gate of FIG. 3, featuring an exemplary bleeding port.
Figure 5:
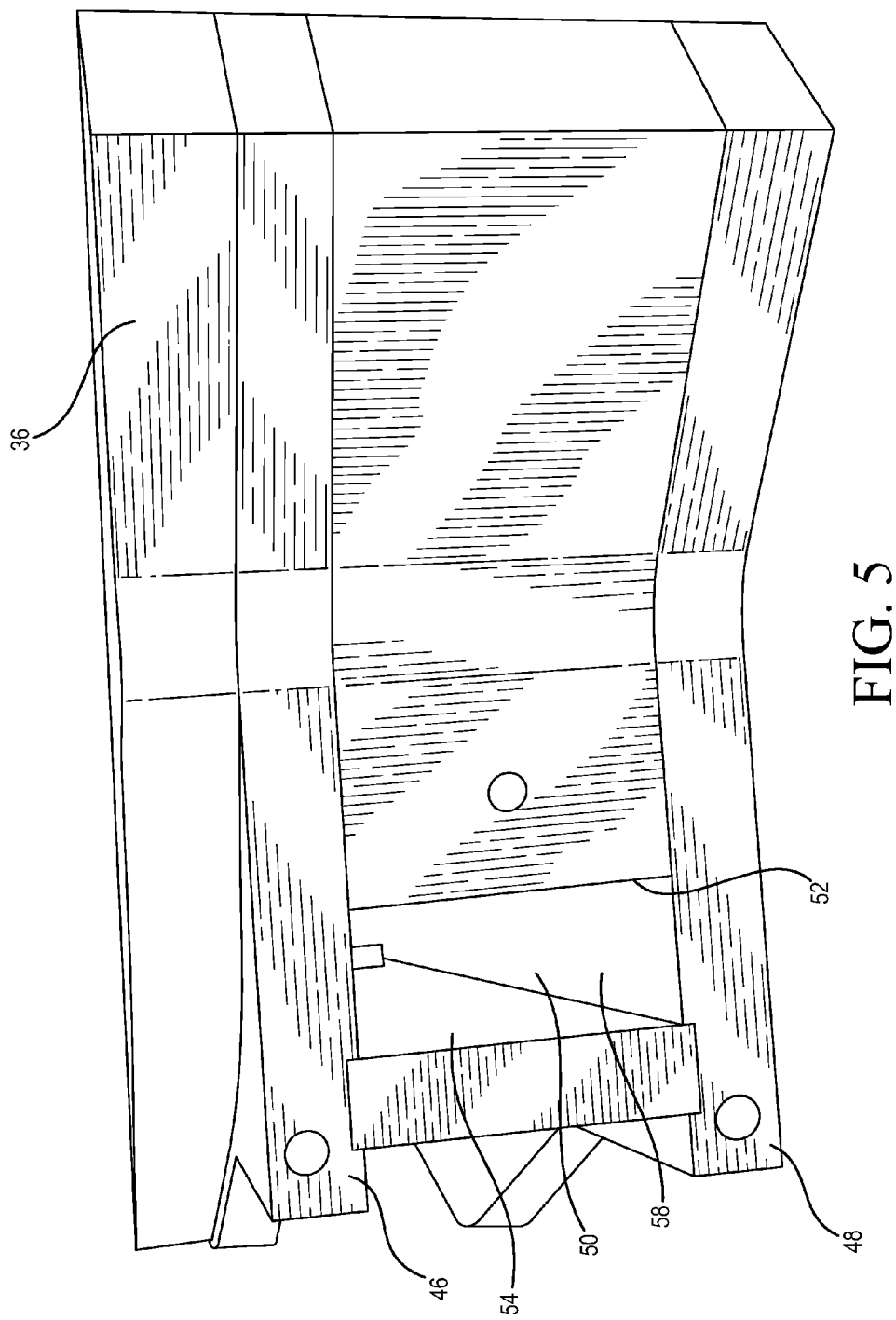
FIG. 5 is an exterior side perspective view of the present discharge gate, featuring an outlet opening.
Figure 6:
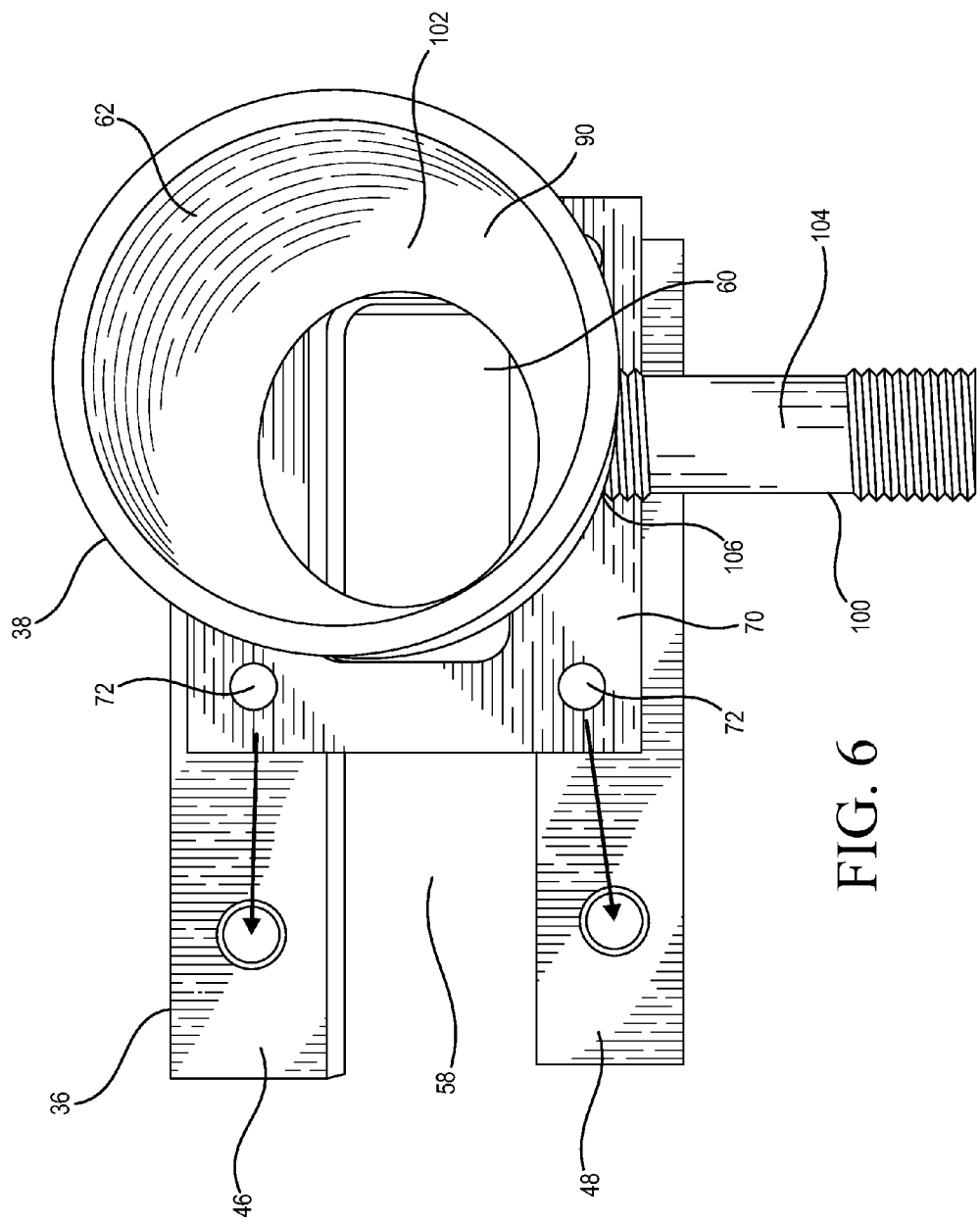
FIG. 6 is an enlarged front perspective view of the gate adapter of FIG. 2 before assembly.

Referring now to FIGS. 3 and 4, an exemplary bleeding port 63 having a central bore is provided on an inner surface of the second side wall 54 for draining a minor portion of the mixed slurry from the mixing chamber 16. The drained portion of the slurry is used for pre-wetting the wallboard on the production line. In the preferred embodiment, the bleeding port 63 includes a "Pacman-shaped" protrusion extending from the inner surface of the second side wall 54 into the mixing chamber 16, but other suitable shapes are also contemplated.

Referring now to FIGS. 1, 2 and 5-8, an important feature of the present discharge gate 36 is that the gate adapter 38 has a transitioning cross-sectional geometry for reducing the slurry buildup and clogging within the cavity 50 or its adjacent areas. It is preferred that the mixer outlet 34 has a quadrilateral, preferably rectangular, opening, and the inlet and outlet openings 56, 58 of the gate 36 have substantially the same quadrilateral shape, defining the cavity 50 in a rectangular cross-sectional geometry. This rectangular opening enhances capture of the mixed slurry in a taller area of the mixing chamber 16 than a conventional circular gate. For example, a circular opening of the conventional circular gate is only one and ⅛ inches tall at its highest point, but the rectangular opening of the present discharge gate 36 is ¾ inches wide and one and ¾ inches tall. Thus, the rectangular opening receives a greater amount of transitory circulating slurry than the circular opening, thereby capturing all the slurry in the mixer and transitioning the rectangular opening into the circular opening for enhancing control of the mixer backpressure.

Figure 7:
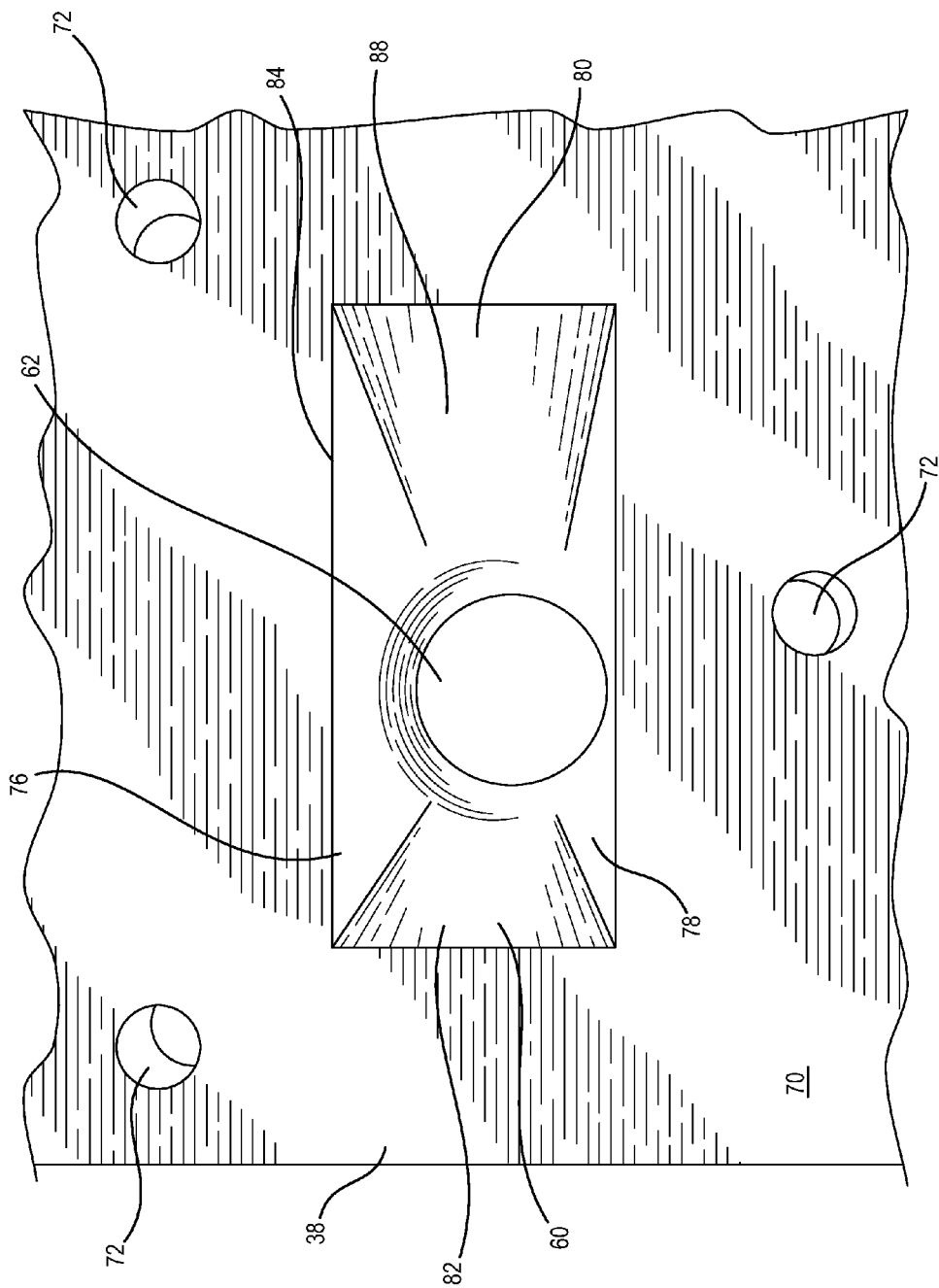
FIG. 7 is a fragmentary side view of the gate adapter of FIG. 2, featuring an inlet opening.

In the preferred embodiment, the gate adapter 38 has two different cross-sectional geometries at its opposite ends. Specifically, an inner periphery of the inlet opening 60 of the gate adapter 38 generally follows an outline or profile of the rectangular outlet opening 58 of the gate 36 for a smooth delivery of the mixed slurry from the gate to the gate adapter without causing flow restriction (FIGS. 1, 7 and 8). However, an outer periphery of the outlet opening 62 of the gate adapter 38 is complementary to the outline or profile of the cylindrical conduit 42. Thus, in the manner of conventional pipe fittings and hose clamps, the conduit 42 is slidably fitted over the outlet opening 62 for delivering the mixed slurry to the dispensing apparatus 40 (FIGS. 1, 7 and 8).

Referring now to FIGS. 2, 7, 8, and 9A-9C, the present gate adapter 38 includes an inlet section 64 having the rectangular inlet opening 60, an outlet section 66 having the circular outlet opening 62, and a transition section 68 sandwiched between the inlet and outlet sections. At the inlet opening 60, a planar plate 70 having a plurality of bores 72 is fixedly attached to the inlet section 64 for connecting the adapter 38 to the gate 36 using fasteners and other suitable methods known in the art. While a quadrilateral shape is shown for the plate 70, other suitable shapes are also contemplated to suit the application.

An important feature of the present gate adapter 38 is that a rectangular or quadrilateral cross-sectional geometry of the inlet opening 60 transitions to a circular cross-sectional geometry of the outlet opening 62 along a longitudinal axis of the gate adapter 38. This configuration provides a gradual, blending, continuously transitioning cross-sectional geometry along the entire length of the longitudinal axis of the gate adapter 38.

More specifically, the inlet section 64 includes an inlet chamber 74 defined by, at least partially, a top wall 76, a bottom wall 78, and two opposite side walls 80, 82 (FIGS. 9A and 9B) of the inlet section. A first inner distance D1 (FIG. 9A) near an outer edge 84 of the inlet section 64 between interior surfaces of the top and bottom walls 76, 78 of the inlet chamber 74 is less than a second opposite inner distance D2 near a first conjoining border 86 of the inlet and transition sections 64, 68 between the interior surfaces of the top and bottom walls.

However, a third inner distance D3 (FIG. 9B) near the outer edge 84 between the interior surfaces of the side walls 80, 82 is greater than a fourth inner distance D4 near the first conjoining border 86 between the interior surfaces of the side walls. As a result, the inlet chamber 74 has a generally quadrilateral, preferably rectangular, cross-sectional geometry, and at least one of the top, bottom, and side walls, 76, 78, 80, 82 has an inclined or tapered interior surface 88 between the outer edge 84 and the first conjoining border 86.

Figure 2:
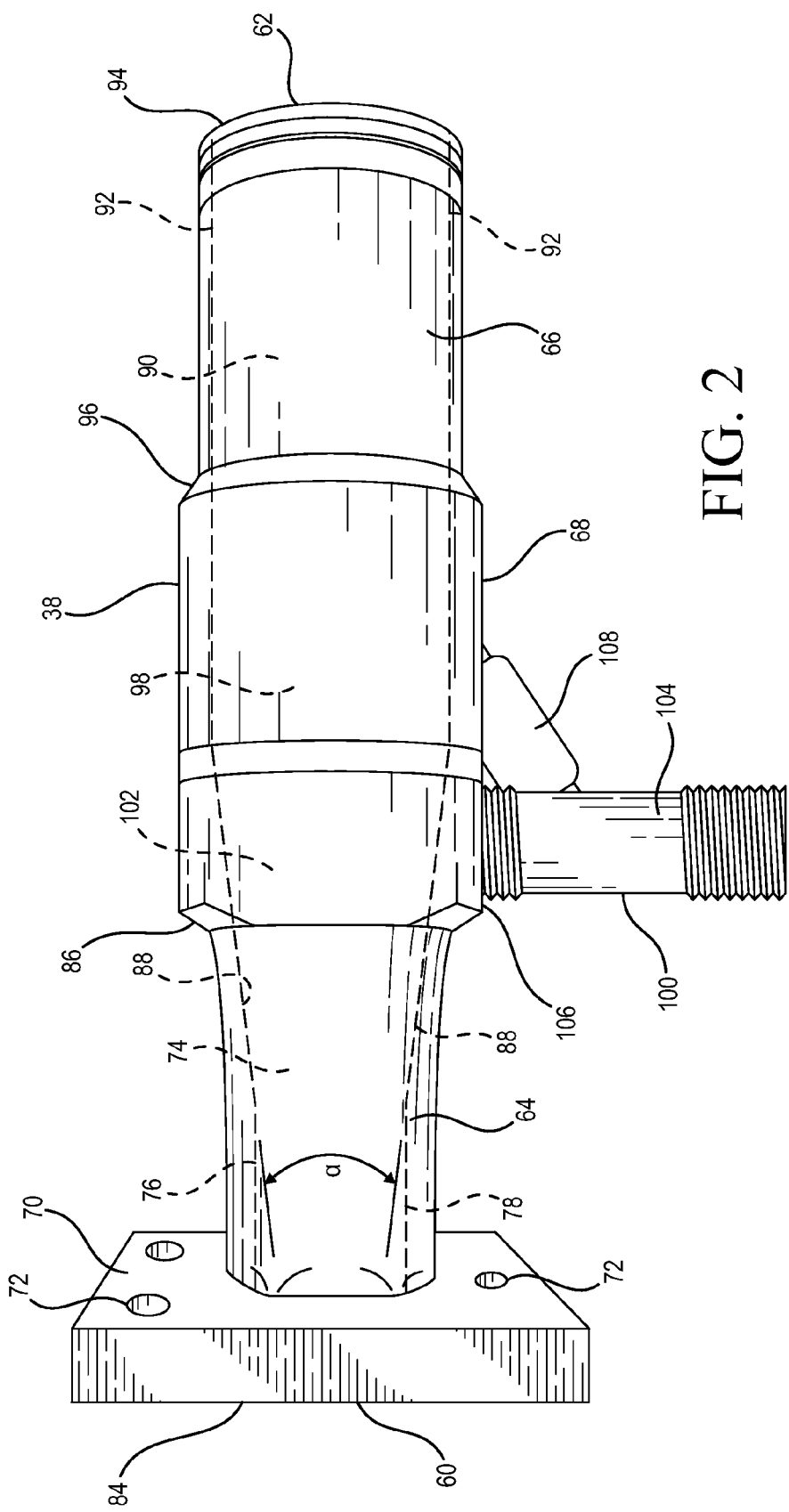
FIG. 2 is a side perspective view of the present gate adapter, featuring an inlet section, an outlet section, and a transition section.

An exemplary angle α of the inclined interior surface 88 when viewed from the side is approximately 23 degrees, gradually inclining toward the first conjoining border 86 for a predetermined length (FIGS. 2 and 9A). It is contemplated that the predetermined length is variable to suit the application. The inclined interior surface 88 facilitates a smooth flow of the mixed slurry from the discharge gate 36, and thus does not disrupt the slurry flow while subsequently entering into the transition and outlet sections 68, 66.

Unlike the inlet section 64, the outlet section 66 includes an outlet chamber 90 defined by a surrounding circular interior wall 92 having a predetermined inner diameter along a longitudinal axis of the outlet section. Thus, a first inner diameter ID1 (FIGS. 9A-9B) near an outer edge 94 of the outlet section 66 and a second inner diameter ID2 near a second conjoining border 96 of the outlet and transition sections 66, 68 have substantially the same length.

Referring now to FIGS. 2, 8 and 9A-9B, another important aspect of the present adapter 38 is that the transition section 68 includes a transition chamber 98 at least partially defined by the top, bottom, and side walls, 76, 78, 80, 82 extending from the inlet section 64 near the first conjoining borer 86. Further, the transition chamber 98 is also at least partially defined by the surrounding circular interior wall 92 extending from the outlet section 66 near the second conjoining border 96. As a result, the transition chamber 98 transitions from the rectangular cross-sectional geometry near the first conjoining border 86 to the circular cross-sectional geometry near the second conjoining border 96 along the longitudinal axis of the transition section 68.

Transitioning of the internal, cross-sectional geometry is gradual and blending along the entire length of the longitudinal axis of the transition section 68. While this transitioning arrangement is shown in the transition section 68 alone, transitioning optionally extends at least partially in the inlet and outlet sections 64, 66 depending on different applications. As such, the inlet, outlet, and transition sections 64, 66, 68 are connected in fluid communication with each other and the cavity 50 of the discharge gate 36 for receiving the mixed slurry. One or more mandrels (not shown) are used to create this transitioning geometry in at least one of the sections 64, 66, 68 by using suitable metal forming and stretching methods known in the art.

Returning now to FIGS. 2, 6, and 9A-9B, at least one of the inlet, outlet, and transition sections, 64, 66, 68, preferably the transition section, has at least one injection or foam port 100 positioned near or at a center of a slurry passageway 102 defined by at least one of the chambers 74, 90, 98. While only one injection port 100 is shown, any number of openings is contemplated depending on the application. Locations of the ports 100 are preferably in the middle of the slurry passageway 102, but other locations in the passageway are contemplated to suit the application. It is preferred that the port 100 is circular, but other suitable geometrical shapes, such as linear, zigzag, elliptical, and irregular figures, are contemplated. For example, the port 100 is used for introduction of aqueous foam or other desired additives. It is contemplated that the port 100 can also be used to measure the pressure required to introduce the additives.

In the preferred embodiment, the injection port 100 has an elongate body 104 to fit an opening 106 (FIG. 9B) for injecting the foam into at least one of the chambers 74, 90, 98, preferably the transition chamber 98, of the gate adapter 38. It is preferred that the elongate body 104 has a cylindrical shape, but other suitable shapes are contemplated to suit different applications. An optional gusset 108 (FIG. 2) is provided for supporting the injection port 100, and attachment of the port 100 to the at least one of the sections 64, 66, 68 is achieved by using complementary threaded ends, adhesives, welding, and other methods known in the art. For example, the port 100 is attached to the transition section 68 of the gate adapter 38 in fluid communication with the transition chamber 98 such that the foam passes through the port, and is injected into the moving slurry in the transition chamber at an approximately 90° angle relative to the running direction of the slurry flow. This configuration of the injection port 100 achieves the desired form injection angle of 90 degrees relative to the slurry flow.

While a particular embodiment of the present discharge gate has been shown and described, it will be appreciated by those skilled in the art that changes and modifications may be made thereto without departing from the present disclosure in its broader aspects and as set forth in the following claims.

What is claimed is:

1. A discharge gate for a gypsum slurry mixer, comprising:
    a gate adapter having an inlet opening configured for receiving the slurry from the mixer, and an outlet opening configured for delivering the slurry to a dispensing device, the gate adapter having two different transitioning cross-sectional geometries at opposite ends;
    the gate adapter including:
    an inlet section having a quadrilateral inlet opening;
    an outlet section having a substantially circular outlet opening; and
    a transition section sandwiched between the inlet and outlet sections, wherein the transition section includes a transition chamber at least partially defined by top, bottom, and side walls extending from the inlet section near a first conjoining border of the inlet and transition sections and wherein the transition chamber is at least partially further defined by a surrounding circular interior wall extending from the outlet section near a second conjoining border of the outlet and transition section.

2. The discharge gate of claim 1, wherein a quadrilateral cross-sectional geometry of the inlet opening transitions to a circular cross-sectional geometry of the outlet opening along a longitudinal axis of the gate adapter.

3. The discharge gate of claim 1, wherein the inlet section includes an inlet chamber defined by, at least partially, a top wall, a bottom wall, and two opposite side walls of the inlet section.

4. The discharge gate of claim 3, wherein a first inner distance near an outer edge of the inlet section between interior surfaces of the top and bottom walls of the inlet chamber is less than a second opposite inner distance near a first conjoining border of the inlet and transition sections between the interior surfaces of the top and bottom walls.

5. The discharge gate of claim 3, wherein a third inner distance near an outer edge of the inlet section between the interior surfaces of the opposite side walls is greater than a fourth inner distance near a first conjoining border of the inlet and transition sections between the interior surfaces of the side walls.

6. The discharge gate of claim 3, wherein the inlet chamber has a generally quadrilateral cross-sectional geometry, and at least one of the top, bottom, and side walls has an inclined interior surface between an outer edge of the inlet section and a first conjoining border of the inlet and transition sections.

7. The discharge gate of claim 1, wherein the outlet section includes an outlet chamber defined by a surrounding circular interior wall having a predetermined inner diameter along a longitudinal axis of the outlet section.

8. The discharge gate of claim 7, wherein a first inner diameter near an outer edge of the outlet section and a second inner diameter near a second conjoining border of the outlet and transition sections have substantially the same length.

9. The discharge gate of claim 1, wherein at least one of the inlet, outlet, and transition sections has at least one injection port positioned near a center of a slurry passageway defined by inner surfaces of at least one of the inlet, outlet, and transition sections.

10. A gate adapter for delivering a mixed slurry from a gypsum slurry mixer, comprising:
    an inlet section having a quadrilateral inlet opening configured for receiving the slurry from the mixer;
    an outlet section having a substantially circular outlet opening configured for delivering the slurry to a dispensing device; and
    a transition section sandwiched between the inlet and outlet sections,
    wherein a quadrilateral cross-sectional geometry of said inlet opening transitions to a circular cross-section geometry of said outlet opening along a longitudinal axis of the gate adapter so that said inlet opening and said outlet opening are aligned along, and share said longitudinal axis.

11. A gate adapter for delivering a mixed slurry from a gypsum slurry mixer, comprising:
    an inlet section having a quadrilateral inlet opening configured for receiving the slurry from the mixer;
    an outlet section having a substantially circular outlet opening configured for delivering the slurry to a dispensing device; and
    a transition section sandwiched between the inlet and outlet sections, wherein the transition section includes a transition chamber at least partially defined by top, bottom, and side walls extending from the inlet section near a first conjoining border of the inlet and transition sections and wherein the transition chamber is at least partially further defined by a surrounding circular interior wall extending from the outlet section near a second conjoining border of the outlet and transition section, and
    wherein a quadrilateral cross-sectional geometry of the inlet opening transitions to a circular cross-section geometry of the outlet opening along a longitudinal axis of the gate adapter.

* * * * *